United States Patent
Kobayashi et al.

(10) Patent No.: US 9,394,412 B2
(45) Date of Patent: Jul. 19, 2016

(54) COMPOSITE CURED SILICONE POWDER AND METHOD FOR PRODUCTION THEREOF

(75) Inventors: Kazuo Kobayashi, Ichihara (JP); Ryuji Tachibana, Ichihara (JP); Tadashi Takimoto, Ichihara (JP)

(73) Assignee: DOW CORNING TORAY CO., LTD., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/387,073

(22) PCT Filed: Jul. 26, 2010

(86) PCT No.: PCT/JP2010/062982
§ 371 (c)(1),
(2), (4) Date: Jan. 25, 2012

(87) PCT Pub. No.: WO2011/013835
PCT Pub. Date: Feb. 3, 2011

(65) Prior Publication Data
US 2012/0121909 A1  May 17, 2012

(30) Foreign Application Priority Data

Jul. 27, 2009 (JP) ................................. 2009-174258

(51) Int. Cl.

| | | |
|---|---|---|
| B32B 15/02 | (2006.01) | |
| C08J 3/20 | (2006.01) | |
| C08L 83/04 | (2006.01) | |
| C08K 13/02 | (2006.01) | |
| C08J 3/12 | (2006.01) | |
| C08G 77/12 | (2006.01) | |
| C08G 77/20 | (2006.01) | |
| C08G 77/50 | (2006.01) | |

(52) U.S. Cl.
CPC .............. *C08J 3/124* (2013.01); *C08G 77/12* (2013.01); *C08G 77/20* (2013.01); *C08G 77/50* (2013.01); *C08J 2383/04* (2013.01); *Y10T 428/2993* (2015.01)

(58) Field of Classification Search
None
See application file for complete search history.

(56) References Cited

U.S. PATENT DOCUMENTS

| | | |
|---|---|---|
| 5,492,945 A | 2/1996 | Morita et al. |
| 5,756,568 A | 5/1998 | Morita et al. |
| 5,948,469 A | 9/1999 | Morita et al. |
| 7,399,803 B2 | 7/2008 | Morita et al. |
| 7,648,766 B2 | 1/2010 | Morita |
| 2006/0018867 A1* | 1/2006 | Kawasaki et al. ......... 424/70.122 |
| 2006/0058440 A1* | 3/2006 | Morita et al. ................. 524/430 |
| 2010/0252144 A1* | 10/2010 | Ishikawa et al. ................ 148/24 |

FOREIGN PATENT DOCUMENTS

| | | |
|---|---|---|
| EP | 0958805 A2 | 11/1999 |
| JP | 4-348143 A | 12/1992 |
| JP | 7-102075 A | 4/1995 |
| JP | 9-208709 A | 8/1997 |
| WO | WO 2004/055099 A1 | 7/2004 |
| WO | WO 2006/073055 * | 7/2006 |
| WO | WO 2008/032883 * | 3/2008 |

OTHER PUBLICATIONS

English language abstract for JP 4-348143 extracted from the espacenet.com database on May 4, 2012, 6 pages.
English language abstract for JP 7-102075 extracted from the espacenet.com database on May 4, 2012, 11 pages.
English language abstract for JP 9-208709 extracted from the espacenet.com database on May 4, 2012, 8 pages.
English language abstract for WO 2004/055099 extracted from the espacenet.com database on May 4, 2012, 25 pages.
International Search Report for Application No. PCT/JP2010/062982 dated Oct. 13, 2011, 3 pages.

* cited by examiner

*Primary Examiner* — Ronak Patel
(74) *Attorney, Agent, or Firm* — Howard & Howard Attorneys PLLC

(57) ABSTRACT

A composite cured silicone powder comprising: (A) a cured silicone powder having an average particle size of 0.1 to 500 μm, (B) an inorganic fine powder coated on the surface of said cured silicone powder and (C) a monohydric or polyhydric alcohol with a boiling point of at least 150° C. coating on the surface of component (A) and/or component (B). The composite cured silicone powder that has an excellent flowability, hydrophilicity, and dispersibility. And, this invention also relates to a production method of the composite, which is characterized by mixing components (A) to (C) under the condition of mechanical shearing.

15 Claims, No Drawings

COMPOSITE CURED SILICONE POWDER AND METHOD FOR PRODUCTION THEREOF

RELATED APPLICATIONS

This application claims priority to and all the advantages of International Patent Application No. PCT/JP2010/062982, filed on Jul. 26, 2010, which claims priority to Japanese Patent Application No. JP 2009-174258, filed on Jul. 27, 2009.

TECHNICAL FIELD

The present invention relates to a composite cured silicone powder comprising a cured silicone powder coated by an inorganic fine powder and to a method of producing this composite cured silicone powder.

BACKGROUND ART

Cured silicone powders are used as additives, for example, for cosmetics, paints, inks, thermosetting organic resins, and thermoplastic organic resins, and are particularly well suited for use as internal stress-relaxing agents for thermosetting organic resins and as surface lubricants for organic resin films. However, these cured silicone powders are strongly aggregative and as a consequence exhibit a poor flowability; moreover, they are poorly dispersible in water-based compositions such as water-based paints and cosmetics. When as a result the cured silicone powder does not undergo uniform dispersion in a water-based composition and occurs in an aggregated state in the water-based composition, a uniform matting effect will then not be generated by the cured silicone powder in the case of water-based paints, while a poor tactile sensation is obtained in the case of cosmetics.

Improved-flowability composite cured silicone powders comprising an inorganic fine powder coated on the surface of a cured silicone powder have been introduced (refer to JP 04-348143 A, JP 07-102075 A, and JP 09-208709 A). However, these composite cured silicone powders have a poor hydrophilicity, and when incorporated into a water-based composition exhibit a poor affinity for the water-based composition.

A composite cured silicone powder having an increased hydrophilicity achieved by attaching a surfactant on the fine inorganic powder has also been introduced (refer to WO 2004/055099). However, to maintain a satisfactory hydrophilicity the surfactant must be attached in large amounts in the case of this composite cured silicone powder, and this has made compositional design of water-based cosmetics quite difficult.

[Patent Reference 1] JP 04-348143 A
[Patent Reference 2] JP 07-102075 A
[Patent Reference 3] JP 09-208709 A
[Patent Reference 4] WO 2004/055099

DISCLOSURE OF INVENTION

Technical Problems to be Solved

An object of the present invention is to provide a composite cured silicone powder that has an excellent flowability, hydrophilicity, and dispersibility. A further object of the present invention is to provide an efficient method of producing this composite cured silicone powder.

Solution to Problems

The composite cured silicone powder of the present invention is a composite cured silicone powder comprising (B) an inorganic fine powder attached on the surface of (A) a cured silicone powder having an average particle size of 0.1 to 500 μm, that characteristically has (C) a monohydric or polyhydric alcohol with a boiling point of at least 150° C. on the surface of component (A) and/or component (B).

The method of the present invention for producing this composite cured silicone powder is characterized by mixing the following components under conditions of mechanical shearing: (A) a cured silicone powder with an average particle size of 0.1 to 500 (B) an inorganic fine powder, and (C) a monohydric or polyhydric alcohol with a boiling point of at least 150° C.

Advantageous Effects of Invention

The composite cured silicone powder of the present invention characteristically has an excellent flowability, hydrophilicity, and dispersibility. The production method of the present invention is characteristically able to efficiently produce this composite cured silicone powder.

BEST MODE FOR CARRYING OUT THE INVENTION

The Cured Silicone Powder (A)

The component (A) cured silicone powder is a cured silicone powder provided by the cure of, for example, an organosilane or an organopolysiloxane, and contains the siloxane bond in its structure. Component (A) can be exemplified by silicone rubber powders and silicone resin powders. Silicone rubber powders are preferred because the hardness of a silicone rubber powder can be broadly adjusted and because a silicone rubber powder can confer various properties matched to a particular application. While the hardness of the cured silicone powder is not particularly limited, its Japanese Industrial Standard (JIS) A hardness is preferably less than 90.

The average particle size of component (A) is in the range from 0.1 to 500 μm and is preferably in the range from 0.1 to 200 μm and is particularly preferably in the range from 0.1 to 100 μm. The reasons for this are as follows. Attachment of the fine inorganic powder on the surface of the cured silicone powder tends to become quite difficult at below the lower limit for the indicated range, while the dispersibility of the obtained composite cured silicone powder in water-based compositions tends to deteriorate when the upper limit on the indicated range is exceeded. In addition, the shape of component (A) is not particularly limited and can be exemplified by spherical, spindle-shaped, and irregularly shaped. A spherical shape is preferred because a spherical shape provides a particularly good flowability, hydrophilicity, and dispersibility for the resulting composite cured silicone powder.

The method of producing component (A) can be exemplified by the following: methods in which a curable silicone composition is cured and the resulting cured silicone material is then ground using a grinding device such as a grinder; methods in which a curable silicone composition is cured by spraying using a spraying device such as a spray drier; and methods in which a curable silicone composition is dispersed and cured in an aqueous surfactant solution. Methods in which a curable silicone composition is dispersed and cured in an aqueous surfactant solution are preferred for their ability to form a spherical cured silicone powder.

The curable silicone composition can be exemplified by addition reaction-curable silicone compositions, condensation reaction-curable silicone compositions, and organoperoxide-curable silicone compositions. The addition reaction-curable silicone compositions can be exemplified by an addition reaction-curable silicone composition that comprises at least an organopolysiloxane that has at least two alkenyl groups in each molecule, an organopolysiloxane that has at least two silicon-bonded hydrogen atoms in each molecule, and a platinum group catalyst.

The alkenyl group in the alkenyl-containing organopolysiloxane can be exemplified by vinyl, allyl, butenyl, pentenyl, and hexenyl wherein vinyl and hexenyl are particularly preferred. The non-alkenyl silicon-bonded groups can be exemplified by substituted and unsubstituted monovalent hydrocarbyl groups such as alkyl groups, e.g., methyl, ethyl, propyl, butyl, and so forth; cycloalkyl groups, e.g., cyclopentyl, cyclohexyl, and so forth; aryl groups such as phenyl, tolyl, xylyl, and so forth; aralkyl groups such as benzyl, phenethyl, 3-phenylpropyl, and so forth; and halogenated alkyl groups such as 3-chloropropyl, 3,3,3-trifluoropropyl, and so forth. The molecular structure of the alkenyl-containing organopolysiloxane can be, for example, straight chain, cyclic, network, and partially branched straight chain, wherein straight chain and partially branched straight chain are particularly preferred. The viscosity of the alkenyl-containing organopolysiloxane is not particularly limited as long as the curable silicone composition can be dispersed in water, but preferably is in the range from 20 to 100,000 mPa·s at 25° C. and particularly preferably is in the range from 20 to 10,000 mPa·s at 25° C.

The non-hydrogen silicon-bonded groups in the silicon-bonded hydrogen-containing organopolysiloxane can be exemplified by the same substituted and unsubstituted monovalent hydrocarbyl groups as given above. The molecular structure of the silicon-bonded hydrogen-containing organopolysiloxane can be exemplified by straight chain, cyclic, network, and partially branched straight chain. Its viscosity is not particularly limited as long as the curable silicone composition can be dispersed in water, but preferably is in the range from 1 to 10,000 mPa·s at 25° C. The content of the silicon-bonded hydrogen-containing organopolysiloxane is not particularly limited as long as a quantity that can bring about the addition reaction-mediated cure of the composition under consideration is present, but is preferably in the range from 0.3 to 500 mass parts per 100 mass parts of the alkenyl-containing organopolysiloxane.

The platinum group catalyst is a catalyst that promotes the addition reaction in the composition under consideration and can be exemplified by platinum catalysts, rhodium catalysts, and palladium catalysts wherein platinum catalysts are particularly preferred. This platinum catalyst can be exemplified by chloroplatinic acid, alcohol solutions of chloroplatinic acid, olefin complexes of platinum, alkenylsiloxane complexes of platinum, platinum black, and platinum supported on silica. The platinum group catalyst content is an amount sufficient to promote the cure of the composition under consideration; for example, when a platinum catalyst is used, this is an amount that provides from 0.1 to 1000 ppm by mass of platinum metal with reference to the total quantity of said organopolysiloxanes.

The condensation reaction-curable silicone compositions can be exemplified by a condensation reaction-curable silicone composition comprising at least an organopolysiloxane that has at least two silicon-bonded hydroxyl or hydrolyzable groups in each molecule wherein the hydrolyzable group can be exemplified by the alkoxy group, oxime group, acetoxy group, aminoxy group, and so forth; a silane-type crosslinking agent that has at least three silicon-bonded hydrolyzable groups in each molecule wherein the hydrolyzable group can be exemplified by the alkoxy group, oxime group, acetoxy group, aminoxy group, and so forth; and a condensation reaction catalyst such as an organotin compound, an organotitanium compound, and so forth. A particularly preferred curable silicone composition comprises at least an organopolysiloxane that has at least two silicon-bonded hydrolyzable groups in each molecule, an organopolysiloxane that has at least two silanol groups in each molecule, and a condensation reaction catalyst.

The hydrolyzable group in the silicon-bonded hydrolyzable group-containing organopolysiloxane can be exemplified by alkoxy groups such as methoxy, ethoxy, methoxyethoxy, and so forth; oxime groups such as methyl ethyl ketoxime, dimethyl ketoxime, and so forth; and also the acetoxy group and aminoxy group, wherein alkoxy is particularly preferred. The silicon-bonded groups present in addition to the hydrolyzable groups can be exemplified by substituted and unsubstituted monovalent hydrocarbyl groups such as alkyl groups, e.g., methyl, ethyl, propyl, butyl, and so forth; cycloalkyl groups, e.g., cyclopentyl, cyclohexyl, and so forth; vinyl, allyl, butenyl, pentenyl, and hexenyl; aryl groups such as phenyl, tolyl, xylyl, and so forth; aralkyl groups such as benzyl, phenethyl, 3-phenylpropyl, and so forth; and halogenated alkyl groups such as 3-chloropropyl, 3,3,3-trifluoropropyl, and so forth. The molecular structure of the silicon-bonded hydrolyzable group-containing organopolysiloxane can be, for example, straight chain, cyclic, network, and partially branched straight chain, wherein straight chain and partially branched straight chain are particularly preferred. The viscosity of the silicon-bonded hydrolyzable group-containing organopolysiloxane is not particularly limited as long as the curable silicone composition can be dispersed in water, but preferably is in the range from 20 to 100,000 mPa·s at 25° C. and particularly preferably is in the range from 20 to 10,000 mPa·s at 25° C.

The non-silanol silicon-bonded groups in the silanol-containing organopolysiloxane can be exemplified by the same substituted and unsubstituted monovalent hydrocarbyl groups as given above. The molecular structure of the silanol-containing organopolysiloxane can be exemplified by straight chain, cyclic, network, and partially branched straight chain, wherein straight chain and partially branched straight chain are particularly preferred. Its viscosity is not particularly limited as long as the curable silicone composition can be dispersed in water, but preferably is in the range from 20 to 100,000 mPa·s at 25° C. and particularly preferably is in the range of 20 to 10,000 mPa·s at 25° C. The content of the silanol-containing organopolysiloxane is not particularly limited as long as a quantity that can bring about the condensation reaction-mediated cure of the composition under consideration is present, but is preferably in the range from 0.01 to 100 mass parts per 100 mass parts of the silicon-bonded hydrolyzable group-containing organopolysiloxane.

The condensation reaction catalyst is a catalyst that promotes the condensation reaction in the composition under consideration and can be exemplified by organotin compounds such as dibutyltin dilaurate, dibutyltin diacetate, tin octenoate, tin octanoate, dibutyltin dioctate, tin laurate, and so forth; organotitanium compounds such as tetrabutyl titanate, tetrapropyl titanate, dibutoxybis(ethyl acetoacetato)titanium, and so forth; and also acidic compounds such as hydrochloric acid, sulfuric acid, dodecylbenzenesulfonic acid, and so forth, and basic compounds such as ammonia, sodium hydroxide, and so forth, wherein organotin compounds and organotitanium compounds are particularly preferred. The condensation reaction catalyst content is an amount sufficient to promote the condensation reaction in the composition under consideration and, for example, is preferably in the range of 0.01 to 5 mass parts and particularly preferably in the range of 0.05 to 2 mass parts, in each case per 100 mass parts of the total of the said organopolysiloxanes.

The particle size of the cured silicone particles can be easily adjusted by emulsifying and curing the curable silicone composition in an aqueous surfactant solution. This surfactant can be exemplified by nonionic surfactants, anionic surfactants, cationic surfactants, and betaine-type surfactants. The particle size of the resulting cured silicone particles can be varied using the surfactant type and surfactant content. In order to produce cured silicone particles having a small particle size, the quantity of surfactant addition is preferably in the range from 0.5 to 50 mass parts per 100 mass parts of the curable silicone composition. In order to produce, on the other hand, cured silicone particles having a large particle size, the quantity of surfactant addition is preferably in the range from 0.1 to 10 mass parts per 100 mass parts of the curable silicone composition. The quantity of the water employed as the dispersion medium is preferably in the range from 20 to 1,500 mass parts per 100 mass parts of the curable silicone composition.

An emulsifying device is preferably used in order to bring about a uniform dispersion of the curable silicone composition in the water. This emulsifying device can be exemplified by homomixers, paddle mixers, Henschel mixers, homodispersers, colloid mills, propeller stirrers, homogenizers, continuous inline emulsifying devices, ultrasonic emulsifying devices, and vacuum kneaders.

The water-based dispersion of the curable silicone composition prepared by the above-mentioned method is then allowed to stand at room temperature or with heating in order to cure the curable silicone composition in the water-based dispersion, and thereby a water-based dispersion of a cured silicone powder is obtained. The heating temperature is preferably not more than 100° C. in those cases in which heat is applied to the water-based dispersion of the curable silicone composition and particularly preferably is 10 to 95° C. The method for heating the water-based dispersion of the curable silicone composition can be exemplified by direct heating of the water-based dispersion and by the addition of this water-based dispersion to hot water. The cured silicone powder can then be produced by removing the water from the water-based dispersion of the cured silicone powder. The method of removing the water from the water-based dispersion of the cured silicone powder can be exemplified by drying using a vacuum drier, drying using a convection oven, and drying using spray drier.

The Inorganic Fine Powder (B)

The aggregation of component (A) is inhibited and the flowability and dispersibility of the composite cured silicone powder of the present invention are improved by coating at least a portion of the component (B) inorganic fine powder on the surface of component (A). In this case, the "coating" denotes a condition in which component (B) coats the surface of component (A) so as to cover component (A) in its entirety or a state in which component (B) is present in a nonuniform distribution on just a portion of the surface of component (A). In addition, a portion of component (B) may be shed from the surface of component (A) and may be present in this loose state in the composite cured silicone powder of the present invention.

Component (B) can be exemplified by finely-divided metal oxide powders such as silicon oxide, titanium oxide, aluminum oxide, zirconium oxide, antimony oxide, and so forth; finely-divided metal nitride powders such as boron nitride, aluminum nitride, and so forth; finely-divided metal hydroxide powders such as aluminum hydroxide, magnesium hydroxide, and so forth; metal carbonate salts such as potassium carbonate and so forth; finely-divided metals such as nickel, cobalt, iron, copper, gold, silver, and so forth; and also finely-divided sulfide powders and finely divided chloride powders. Preferred thereamong are metal oxide fine powders because they offer cost advantages due to their ease of acquisition, and silica fine powder is particularly preferred. The average particle size of component (B) should be an average particle size that makes possible attachment to the surface of component (A) but is not otherwise particularly limited. In specific terms, the average particle size is preferably not more than one-tenth the average particle size of component (A).

The Hydrophilic Oil (C)

Component (C) imparts hydrophilicity and dispersibility to the composite cured silicone powder of the present invention and is a monohydric or polyhydric alcohol that has a boiling point of at least 150° C. Component (C) can be exemplified by monohydric alcohols such as isodecyl alcohol, isotridecyl alcohol, and so forth, and by polyhydric alcohols such as 1,3-butanediol, 1,2-pentanediol, ethylene glycol, dipropylene glycol, and so forth. Component (C) preferably has a viscosity at 25° C. of not more than 500 mPa·s and particularly preferably not more than 200 mPa·s because this facilitates coating on the surface of component (A) or component (B).

The Composite Cured Silicone Powder

The coated amounts of components (B) and (C) with respect to component (A) are quantities that provide the resulting composite cured silicone particles with a satisfactory flowability and hydrophilicity, but are not otherwise particularly limited. While the coated amounts of components (B) and (C) will vary with the particle size of component (A), the coated amount for components (B) and (C) are preferably in the range of 2 to 30 mass parts of component (B) per 100 mass parts of component (A) and 2 to 20 mass parts of component (C) per 100 mass parts of component (A), and particularly preferably are in the range of 3 to 20 mass parts of component (B) per 100 mass parts of component (A) and 3 to 10 mass parts of component (C) per 100 mass parts of component (A). The reasons for this are as follows: when the addition-quantity of component (B) or (C) is over the indicated range, the flowability of the obtained composite cured silicone particles tends to deteriorate and/or it tends to be difficult to obtain an increased hydrophilicity.

Mixing the previously described components (A), (B), and (C) with the application of mechanical shear is preferred for the method of producing the composite cured silicone powder of the present invention. The Henschel mixer and Supermixer are examples of devices that can mix components (A), (B), and (C) under conditions of mechanical shearing. The temperature for mixing components (A), (B), and (C) is not particularly limited and mixing can be performed, for example, even at room temperature. With regard to the mixing time, the poorly flowable component (A) is converted over to exhibiting flowability by the attachment to its surface of component (B), and an appropriate mixing time must therefore be determined by monitoring this change in state.

In the production method of the present invention, components (A), (B), and (C) may all be mixed simultaneously; or component (A) may be mixed with component (B) in advance followed by mixing component (C) thereinto; or component (A) may be mixed with component (C) in advance followed by mixing component (B) thereinto. Component (A) is particularly preferably mixed in advance with component (C) following by mixing component (B) thereinto. This can bring about a uniform attachment of component (C) on the surface of component (A) and can thereby raise the hydrophilicity of the composite cured silicone powder.

The quantity of addition of component (B) in the production method of the present invention is a quantity sufficient to coat the surface of component (A) and specifically is preferably in the range of 2 to 30 mass parts per 100 mass parts of component (A) and is particularly preferably in the range of 3 to 20 mass parts per 100 mass parts of component (A).

The quantity of addition of component (C) in the production method of the present invention is a quantity sufficient to impart a satisfactory hydrophilicity to component (A) and, while the quantity of component (C) addition will also vary as a function of the noncrosslinking oil content in component (A), in specific terms it is preferably in the range of 2 to 20 mass parts per 100 mass parts of component (A) and is particularly preferably in the range of 3 to 10 mass parts per 100 mass parts of component (A).

EXAMPLES

The composite cured silicone powder of the present invention and its method of production are described in more detail through practical examples and comparative examples. The viscosity in the examples is the value at 25° C. The properties of the cured silicone powders and composite cured silicone powders were measured as follows.

[JIS A Hardness of Cured Silicone Powder]

The curable silicone composition that was the precursor for the cured silicone powder was cured into sheet form. The hardness of this sheet was measured using the JIS A hardness tester stipulated in JIS K 6301.

[Average Particle Size]

The water-based dispersion or ethanolic dispersion of the cured silicone powder or composite cured silicone powder was measured using a laser diffraction instrument for measuring particle size distributions (LA-750 from Horiba, Ltd.), and the median diameter (particle diameter corresponding to 50% in the cumulative distribution, 50% particle diameter) provided by this measurement was employed as the average particle size.

[Hydrophilicity]

10 mL of water was measured into a glass bottle with a capacity of 30 cc; 1 g of the cured silicone powder or composite cured silicone powder was then slowly added; and the glass bottle was stood for 3 minutes. An evaluation was thereafter performed as following standards:

Excellent (○): the hydrophilicity was scored as excellent (○) when the cured silicone powder or composite cured silicone powder was easily blended right into the water and was homogeneously dispersed in the water;

Poor (x): the hydrophilicity was scored as poor (x) when cured silicone powder or composite cured silicone powder was remained as floating things on the water surface.

[Dispersibility]

10 mL of water was measured into a glass bottle with a capacity of 30 cc; 1 g of the cured silicone powder or composite cured silicone powder was then slowly added; and the glass bottle was stood for three minutes. The glass bottle was subsequently stoppered and manually shaken by ten times and an evaluation was thereafter performed as following standards:

Excellent (○): the dispersibility was scored as excellent (○) when the cured silicone powder or composite cured silicone powder was dispersed in a finely divided particulate form in the water;

Poor (x): the dispersibility was scored as poor (x) when coarse particles could easily be seen even though dispersion in the water had occurred. This same dispersibility evaluation was also performed on the cured silicone powder or composite cured silicone powder after storage for 1 week at 50° C. and storage for 2 weeks at 50° C.

The components used in the examples are described below.

The Cured Silicone Powder (A)

A cured silicone rubber powder was prepared as follows.

Reference Example 1

An addition reaction-curable silicone composition was prepared by mixing the following to uniformity at 5° C.:

88.8 mass parts of a dimethylvinylpolysiloxane with the average formula:

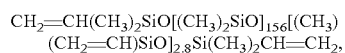

11.2 mass parts of a dimethyl-methylhydrogenpolysiloxane endblocked by trimethylsiloxy at both molecular chain terminals and having the average formula

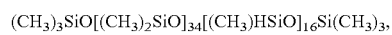

and an isopropyl alcohol solution of chloroplatinic acid in an amount that provided 50 mass-ppm of platinum metal in this composition.

This composition was then dispersed in a 25° C. aqueous solution comprising 50 mass parts of pure water and 1.5 mass parts of polyoxyethylene isocetyl ether. The obtained mixture was uniformly emulsified by a colloid mill and the emulsified one was diluted with additional 50 mass parts of water to prepare a reactive emulsion.

This reactive emulsion was allowed to stand at 35° C. for 3 days, and a uniform water-based suspension of silicone rubber particles was obtained. Then, the silicone rubber particle was precipitated by adding ethanol to this water-based suspension. The precipitated silicone rubber particle was washed by decantation; and drying was thereafter carried out in a convection oven at 150° C. to produce a silicone rubber powder. This silicone rubber powder was spherical and had an average particle size of 6.2 µm and a JIS A hardness of 60.

Practical Example 1

30 mass parts of the silicone rubber powder prepared in Reference Example 1 and 1.2 mass parts of 1,3-butanediol (viscosity=96 mPa·s, boiling point=207.5° C.) were introduced into a Supermixer (Internal capacity: 20 L, a Henschel type mixer from Kawata Mfg. Co., Ltd., product name: V-20) and were mixed for 60 minutes at room temperature. 1.5 mass parts of a silica fine powder (Aerosil 200 from Nippon Aerosil Co., Ltd., average primary particle diameter=5 to 15 nm, BET specific surface area=200 m²/g, surface silanol density=4.2/nm²) was then introduced and mixing was performed for 60 minutes at room temperature. The hydrophilicity and dispersibility of the resulting composite silicone rubber powder were evaluated and are reported in Table 1.

Practical Example 2

30 mass parts of the silicone rubber powder prepared in Reference Example 1 and 1.2 mass parts of dipropylene glycol (viscosity=73 mPa·s, boiling point=231° C.) were introduced into a Supermixer (Internal capacity: 20 L, a Henschel type mixer from Kawata Mfg. Co., Ltd., product name: V-20) and were mixed for 60 minutes at room temperature. 1.5 mass parts of a silica fine powder (Aerosil 200 from Nippon Aerosil Co., Ltd., average primary particle diameter=5 to 15 nm, BET specific surface area=200 m²/g, surface silanol density=4.2/nm²) was then introduced and mixing was performed for 60 minutes at room temperature. The hydrophilicity and dispersibility of the resulting composite silicone rubber powder were evaluated and are reported in Table 1.

Practical Example 3

30 mass parts of the silicone rubber powder prepared in Reference Example 1 and 1.2 mass parts of ethylene glycol (viscosity=16 mPa·s, boiling point=197.3° C.) were introduced into a Supermixer (Internal capacity: 20 L, a Henschel type mixer from Kawata Mfg. Co., Ltd., product name: V-20) and were mixed for 60 minutes at room temperature. 5.0 mass parts of a titanium oxide fine powder (Titanoxide P25 from Nippon Aerosil Co., Ltd., average primary particle diameter=approximately 21 nm, BET specific surface area=50 m²/g) was then introduced and mixing was performed for 60 minutes at room temperature. The hydrophilicity and dispersibility of the resulting composite silicone rubber powder were evaluated and are reported in Table 1.

Practical Example 4

30 mass parts of the silicone rubber powder prepared in Reference Example 1 and 1.2 mass parts of 1,3-butanediol (viscosity=96 mPa·s, boiling point=207.5° C.) were introduced into a Supermixer (Internal capacity: 20 L, a Henschel type mixer from Kawata Mfg. Co., Ltd., product name: V-20) and were mixed for 60 minutes at room temperature. 2.0 mass parts of a finely divided alumina powder (SpectrAl PC-401 Fumed Alumina from the Cabot Corporation) was then introduced and mixing was performed for 60 minutes at room temperature. The hydrophilicity and dispersibility of the resulting composite silicone rubber powder were evaluated and are reported in Table 1.

Practical Example 5

30 mass parts of the silicone rubber powder prepared in Reference Example 1 and 1.2 mass parts glycerol (viscosity=1,500 mPa·s, boiling point=290° C.) were introduced into a Supermixer (Internal capacity: 20 L, a Henschel type mixer from Kawata Mfg. Co., Ltd., product name: V-20) and were mixed for 60 minutes at room temperature. 1.5 mass parts of a finely divided silica powder (Aerosil 200 from Nippon Aerosil Co., Ltd., average primary particle diameter=5 to 15 nm, BET specific surface area=200 m²/g, surface silanol density=4.2/nm²) was then introduced and mixing was performed for 60 minutes at room temperature. The hydrophilicity and dispersibility of the resulting composite silicone rubber powder were evaluated and are reported in Table 1.

Practical Example 6

30 mass parts of the silicone rubber powder prepared in Reference Example 1 and 1.5 mass parts of a silica fine powder (Aerosil 200 from Nippon Aerosil Co., Ltd., average primary particle diameter=5 to 15 nm, BET specific surface area=200 m²/g, surface silanol density=4.2/nm²) were introduced into a Supermixer (Internal capacity: 20 L, a Henschel type mixer from Kawata Mfg. Co., Ltd., product name: V-20) and were mixed for 60 minutes at room temperature. 1.2 mass parts of 1,3-butanediol (viscosity=96 mPa·s, boiling point=207.5° C.) was then introduced and mixing was performed for 60 minutes at room temperature. The hydrophilicity and dispersibility of the resulting composite silicone rubber powder were evaluated and are reported in Table 1.

Comparative Example 1

The hydrophilicity and dispersibility of the silicone rubber powder prepared in Reference Example 1 were evaluated and are reported in Table 1.

Comparative Example 2

30 mass parts of the silicone rubber powder prepared in Reference Example 1 and 1.5 mass parts of a silica fine powder (Aerosil 200 from Nippon Aerosil Co., Ltd., average primary particle diameter=5 to 15 nm, BET specific surface area=200 m²/g, surface silanol density=4.2/nm²) were introduced into a Supermixer (Internal capacity: 20 L, a Henschel type mixer from Kawata Mfg. Co., Ltd., product name: V-20) and were mixed for 60 minutes at room temperature. The hydrophilicity and dispersibility of the resulting composite silicone rubber powder were evaluated and are reported in Table 1.

Comparative Example 3

30 mass parts of the silicone rubber powder prepared in Reference Example 1 and 1.2 mass parts of 1,3-butanediol (viscosity=96 mPa·s, boiling point=207.5° C.) were introduced into a Supermixer (Internal capacity: 20 L, a Henschel type mixer from Kawata Mfg. Co., Ltd., product name: V-20) and were mixed for 60 minutes at room temperature. The hydrophilicity and dispersibility of the resulting silicone rubber powder were evaluated and are reported in Table 1.

Comparative Example 4

30 mass parts of the silicone rubber powder prepared in Reference Example 1 and 3.6 mass parts of 1,3-butanediol (viscosity=96 mPa·s, boiling point=207.5° C.) were introduced into a Supermixer (20 L internal capacity, a Henschel type mixer from Kawata Mfg. Co., Ltd., product name: V-20) and were mixed for 60 minutes at room temperature. The hydrophilicity and dispersibility of the resulting silicone rubber powder were evaluated and are reported in Table 1.

TABLE 1

| | (mass parts) | | Practical examples | | | | | | comparative examples | | | |
|---|---|---|---|---|---|---|---|---|---|---|---|---|
| | | | 1 | 2 | 3 | 4 | 5 | 6 | 1 | 2 | 3 | 4 |
| formulation | silicone rubber powder | | 30 | 30 | 30 | 30 | 30 | 30 | 30 | 30 | 30 | 30 |
| | alcohol | 1,3-butanediol | 1.2 | — | — | 1.2 | — | 1.2 | — | — | 1.2 | 3.6 |
| | | dipropylene glycol | — | 1.2 | — | — | — | — | — | — | — | — |

TABLE 1-continued

| (mass parts) | | | Practical examples | | | | | | comparative examples | | | |
|---|---|---|---|---|---|---|---|---|---|---|---|---|
| | | | 1 | 2 | 3 | 4 | 5 | 6 | 1 | 2 | 3 | 4 |
| | inorganic fine powder | ethylene glycol | — | — | 1.2 | — | — | — | — | — | — | — |
| | | glycerol | — | — | — | — | 1.2 | — | — | — | — | — |
| | | silica fine powder | 1.5 | 1.5 | — | — | 1.5 | 1.5 | — | 1.5 | — | — |
| | | titanium oxide fine powder | — | — | 5 | — | — | — | — | — | — | — |
| | | Alumina fine powder | — | — | — | 2 | — | — | — | — | — | — |
| properties | hydrophilicity dispersibility | | ○ | ○ | ○ | ○ | ○ | ○ | x | x | ○ | ○ |
| | immediately after production | | ○ | ○ | ○ | ○ | ○ | ○ | x | x | x | x |
| | after ageing for 1 week at 50° C. | | ○ | ○ | ○ | ○ | ○ | ○ | x | x | x | x |
| | after ageing for 2 months at 50° C. | | ○ | ○ | ○ | ○ | x | ○ | x | x | x | x |

INDUSTRIAL APPLICABILITY

The composite cured silicone powder of the present invention has an excellent flowability, hydrophilicity, and dispersibility. Therefore, it is well suited for use as a raw material for water-based paints and water-based cosmetics. A uniform matting effect can be expected for water-based paints that incorporate this composite cured silicone powder, and this composite cured silicone powder can also be utilized as an additive or modifier for the purpose of, for example, inhibiting cracking in a paint or coating film, lowering the elasticity of a paint or coating film, and so forth. An excellent tactile sensation can also be expected for water-based cosmetics that incorporate this composite cured silicone powder.

The invention claimed is:

1. A composite cured silicone powder comprising:
   (A) a cured silicone powder having an average particle size of 0.1 to 500 µm;
   (B) an inorganic fine powder coated on the surface of said cured silicone powder, and
   (C) a monohydric or polyhydric alcohol with a boiling point of at least 150° C. and a viscosity at 25° C. of not more than 500 mPa·s uniformly coated on the surface of component (A) and/or component (B), component (C) being present in an amount of 2 to 20 mass parts per 100 mass parts of component (A), wherein component (C) is selected from the group consisting of 1,3-butanediol, 1,2-pentanediol, and dipropylene glycol.

2. The composite cured silicone powder according to claim 1, wherein component (B) is a finely divided metal oxide powder.

3. The composite cured silicone powder according to claim 1, wherein component (B) is selected form the group consisting of a silica fine powder, an alumina fine powder, and a titanium oxide fine powder.

4. The composite cured silicone powder according to claim 1, wherein
   component (A) is a silicone rubber powder having an average particle size of 0.1 to 200 µm;
   component (B) is metal oxide fine powder; and
   component (C) has a viscosity at 25° C. of not more than 200 mPa·s.

5. The composite cured silicone powder according to claim 1, wherein component (B) is present in an amount of 2 to 30 mass parts per 100 mass parts of component (A).

6. The composite cured silicone powder according to claim 1, wherein the viscosity of component (C) at 25° C. is not more than 200 mPa·s.

7. The composite cured silicone powder according to claim 1, wherein component (C) is 1,3-butanediol.

8. The composite cured silicone powder according to claim 1, wherein component (C) is uniformly attached to the surface of component (A).

9. A method of producing a composite cured silicone powder, said method comprising mixing the following components under conditions of mechanical shearing:
   (A) a cured silicone powder with an average particle size of 0.1 to 500 µm,
   (B) an inorganic fine powder, and
   (C) a monohydric or polyhydric alcohol with a boiling point of at least 150° C. and a viscosity at 25° C. of not more than 500 mPa·s, component (C) being present in an amount of 2 to 20 mass parts per 100 mass parts of component (A), wherein component (C) uniformly coats on the surface of component (A) and/or component (B), wherein component (C) is selected from the group consisting of 1,3-butanediol, 1,2-pentanediol, and dipropylene glycol.

10. The production method according to claim 9, wherein component (B) is a metal oxide fine powder.

11. The production method according to claim 9, wherein component (B) is selected from the group consisting of a silica fine powder, an alumina fine powder, and a titanium oxide fine powder.

12. The production method according to claim 9, wherein
   component (A) is a silicone rubber powder having an average particle size of 0.1 to 200 µm;
   component (B) is metal oxide fine powder; and
   component (C) has a viscosity at 25° C. of not more than 200 mPa·s.

13. The production method according to claim 9, wherein component (B) is present in an amount of 2 to 30 mass parts per 100 mass parts of component (A).

14. The production method according to claim 9, wherein the viscosity of component (C) at 25° C. is not more than 200 mPa·s.

15. The production method according to claim 9, wherein component (C) is 1,3-butanediol.

* * * * *